United States Patent [19]
Edwards

[11] Patent Number: 5,590,360
[45] Date of Patent: Dec. 31, 1996

[54] APPARATUS AND METHOD FOR GATHERING AND ENTERING DATA REQUIREMENTS FROM MULTIPLE USERS IN THE BUILDING OF PROCESS MODELS AND DATA MODELS

[75] Inventor: Geraldine E. Edwards, Redding, Conn.

[73] Assignee: International Business Machines Corporation, Armonk, N.Y.

[21] Appl. No.: 360,195

[22] Filed: Dec. 20, 1994

Related U.S. Application Data

[63] Continuation of Ser. No. 962,764, Oct. 19, 1992, abandoned.

[51] Int. Cl.$^6$ ..................................................... G06F 15/40
[52] U.S. Cl. .................... 395/800; 395/200.04; 395/927; 434/350; 364/242.95; 364/274.8; 364/DIG. 1
[58] Field of Search ..................................... 395/800, 600, 395/200.04, 927; 364/242.95, 274.8, DIG. 1; 434/350

[56] References Cited

U.S. PATENT DOCUMENTS 4,868,866  9/1989  Williams, Jr. ............................. 380/49
5,019,961  5/1991  Addesso et al. ......................... 364/192
5,263,869  11/1993 Ziv-El ..................................... 434/336
5,289,372  2/1994  Guthrie et al. .......................... 364/403
5,295,222  3/1994  Wadhwa et al. ............................ 395/1

OTHER PUBLICATIONS

DBM OS/2 Programming Tools and Information, Ver.1.2, pp. 11–1–11–2, 14–3–14–6, and 15–1–15–2, and 16–5–16–6.

Primary Examiner—Alyssa H. Bowler
Assistant Examiner—John Harrity
Attorney, Agent, or Firm—Marc Block

[57] ABSTRACT

A computer-based apparatus and method for gathering Information for data model and Process model development includes a plurality of terminals on a local area network at which multiple users enter Information in a structured manner in response to an ordered sequence of screens displayed for a given project; a centralized database for receiving the Information from the multiple users; and a bridge program for transforming the group-entered Information stored in the database into a format that a computer-based information engineering tool can create into a model. An analyst workstation is included to enable only an analyst to edit gathered Information in response to comments from users and provide certain consensus inputs.

10 Claims, 14 Drawing Sheets

FIG. 14

Process Details

Process Name: Prepare Equipment Order

Associated Data Flow:
- Equipment Order
- Equipment Order
- Vendor Record

Data Flow Type:
- ○ Process
- ○ Data Store
- ○ External Agent

Available Components:
- Enter a new component here
- equipment amount
- geasfadfads
- Hardware
- Hardware amount
- hardware size
- hardware type
- Inventory count
- Inventory type
- Machine

[Description]  [Description]  [Cancel]

FIG. 15

Process Details

Process Name: Prepare Equipment Order

Associated Data Flow:
- Equipment Order
- [Details]  ○ Input  ● Output

Data Flow Type:
- ● Process
- ○ Data Store
- ○ External Agent

Associated Component List:
- Hardware amount
- hardware type
- order
- order number
- vendor
- Vendor Account Number
- Vendor address
- Vendor City
- Vendor code
- Vendor name Available Components:
- Enter a new component here
- equipment amount
- geasfadfads
- Hardware
- Hardware amount
- hardware size
- hardware type
- Inventory count
- Inventory type
- Machine

[Description]  [Description]  [Cancel]

Available Component Description

Component Name Vendor Name

Assignment Status

☐ Unassigned   ☒ Attribute   ☐ Entity

Name of external supplier of goods.

Cancel

FIG. 16

APPARATUS AND METHOD FOR GATHERING AND ENTERING DATA REQUIREMENTS FROM MULTIPLE USERS IN THE BUILDING OF PROCESS MODELS AND DATA MODELS

The application is a continuation of application Ser. No. 07/962,764, filed Oct. 19, 1992, now abandoned.

FIELD OF THE INVENTION

The present invention relates to Requirements gathering and computer-based modelling of Processes and data.

BACKGROUND OF THE INVENTION

In developing software applications and defining business methods, it is important to gather Requirements and generate models for data flow and for Processes. The technology used in accumulating and re-constructing information into a useful form is referred to as information engineering. Information engineering involves various techniques and tools, some of which are computer-based. Currently, a number of computer-based information engineering tools are available to help convert information into a model that better defines a business procedure, practice, or other Process. One model, a data flow model, shows how items of data are passed into and out of the Process or within the Process itself. Another model, a Process model, shows how Processes relate to each other and is often depicted in a decomposition diagram. A decomposition diagram shows a Parent Process together with the offspring Processes that together compose the Parent Process. In effect, the decomposition diagram reflects Processes in varying levels of detail. Information engineering tools can also furnish an output that shows how Components of a Process are related.

Oftentimes, Processes and data are to be used in the development of software applications. Creating software includes to initial stages. First, the developer gathers Requirements to determine what the software application should do. The second stage is the design of the software application once the needs and objectives are defined. The models and other output furnished by the information engineering tool are used by software developers in the first stage of application creation.

As demand for new software applications increases and as programmer productivity increases, the automating of software development becomes important. This has prompted software developers to employ Computer-Aided Software Engineering (CASE) tools to increase productivity. Also, in this regard, developers have looked to existing computerized information engineering tools in the gathering of Requirements and data in the first stage of development.

Knowledgeware Application Development Workbench (ADW)* is one such tool. Knowledgeware's ADW includes an encyclopedia feature that is used to automatically generate data models and/or Processes models and depict them as diagrams or other useful outputs. CASE tools available from Bachman Information Systems, Inc. also provide an output that can be used in providing computer-generated models.

Application Development Workbench is a registered trademark of Knowledgeware Inc.

These and other existing computerized information engineering tools, however, provide for a single user to enter data according to a strict format. The user manually gathers Information; structures the Information into a format that the Knowledgeware ADW, Bachman tools, or other computerized information engineering tools understand; and enters it in that format. This conventional approach is normally time-consuming, inefficient, and requires the user who enters the information to be versed in the information engineering tool format. This conventional approach provides no coordinated, formal communication between the gathering of Requirements and data of the first development stage and the application design of the second stage. This can lead to successive re-writes and maintenance, which can add to the time for application development cycle time and which can result in applications that do not reflect complete and accurate Requirements.

In some instances, a "scribe" at a terminal listens to successive inputs proposed by a number of participants who are not at terminals. The "scribe" hears and enters data serially and must pay attention to make sure that he properly enters the inputs. The session can become lengthy and difficult to administer, especially as participants wait for the scribe to properly format the successive inputs.

In another environment, a number of participants sit at terminals and enter data simultaneously, anonymously and with limited interaction. The results are, in such instances, confidential and discarded when a session ends.

Moreover, no facility for providing data that can be modelled or exported to a computer-based information engineering tool for modelling is provided. Moreover, user names are not captured in such tools in order to maintain anonymity.

SUMMARY OF THE INVENTION

The present invention provides a front-end to the existing computerized information engineering tools that build models. More specifically, the present invention is designed to enable multiple users at terminals on a local area network to enter Information in natural language and participate in its characterization during a joint session. By having multiple users, who are familiar with a project, enter Information during a session and later reviewing the gathered Information and characterizations thereof, enhanced accuracy and completeness can be achieved.

Also, the benefits of brainstorming, parallel and simultaneous processing of Information, the forming of a group consensus on the derived results, and enhanced coordination and communication from Requirement gathering to design are achievable. Also, by using natural language rather than the strict formats of existing computerized information engineering tools, input can be provided by more users who require less training.

Also, the invention includes a feature of identifying the user that enters a specific input, so that other users can discuss the input with the source thereof.

It is thus a goal of the invention to shorten, in a joint software development context, the application development period and to increase productivity.

It is also a goal of the invention to produce software that is based on Information gathered and reviewed by multiple people at the same time.

It is another goal of the invention to provide an analyst at a specific terminal on a local area network (LAN) which, preferably unlike other terminals on the LAN, is authorized to add, delete, or otherwise edit gathered data when it is reviewed by the multiple users during a "review" phase. The analyst machine is also used for administrative functions, such as setting up the invention for an identified group of users working on a specific project.

The present invention achieves these goals by providing a terminal on a LAN for each participant, or user, in a prescribed project. A collection of predefined screens are stored and presented to the users in a structured manner. Menus furnish requests that users can respond to in natural language or by menu selection, the invention storing responses in a centralized database located in a file server on the LAN. Depending on the screen and, by way of example, the box on the screen into which data is entered, the data is directed to a specific location in a specific table stored in the database. The Information stored into the centralized database includes Entities, Attributes, External agents, Cardinalities, Data Flows, Data Stores, and Parent Process group hierarchies. The Parent Process group hierarchies define parent/offspring relations among Processes, indicating which Processes compose a more generic umbrella Process.

A "bridge program" converts the Information stored in the tables (preferably after review by the participants and editing by the analyst) into the format recognized by a computer-based information engineering tool, such as Knowledgeware ADW. While the input to the bridge program remains the same, the required output differs for differing information engineering tools. Hence, while different bridge programs may be required for different computer-based information engineering tools, the Requirements and data gathering portions of the invention should remain unchanged for a variety of tools. The invention thereby achieves flexibility and usefulness in various information engineering environments.

BRIEF DESCRIPTION OF DRAWINGS

FIG. 14 is a menu used for entering Process details.

FIG. 15 is a menu used for describing a Component.

FIG. 16 is an illustration of a screen that appears to show the nature of a selected component.

DESCRIPTION OF THE INVENTION

1. Definitions

Figure 1:
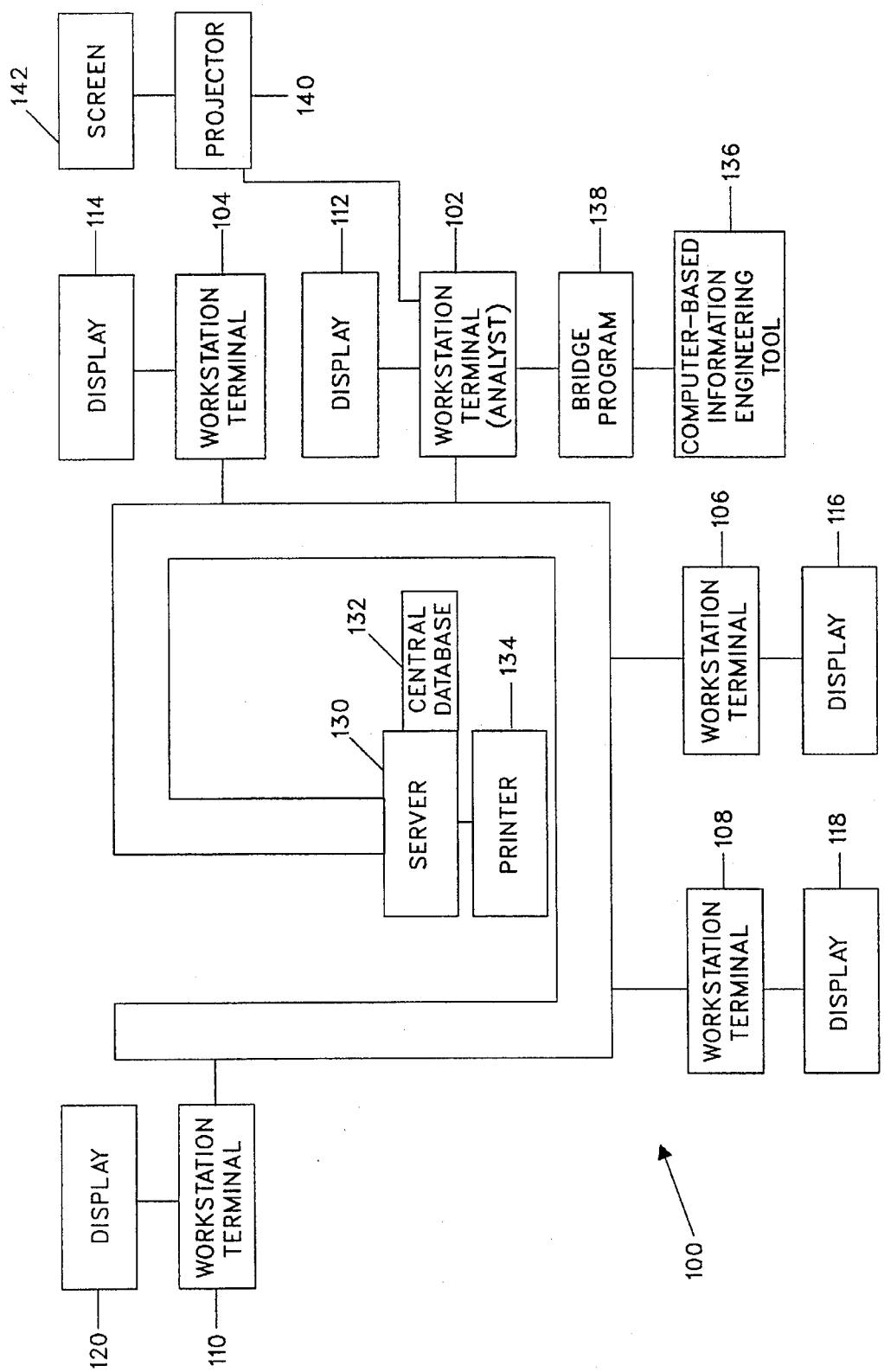
FIG. 1 is a block diagram showing hardware and software elements of the invention.

Associations mean relationships between Objects.

Attribute means an element of data that is a characteristic or property of an Entity, which describes the Entity in terms of a value the Entity can have and which is stored in a record in a database table.

Cardinality means a number corresponding to a maximum or minimum value attached to an Attribute.

Component means a data item which is not broken down into more elemental form. Components include Entities and Attributes and data items that are not either. In a Process relating to personnel, "EMPLOYEE" and "SALARY" could represent types of "Entities". "Attributes" for EMPLOYEE could include "EMPLOYEE NAME" and "EMPLOYEE ADDRESS". All these items are Components.

Data Flow means data serving as input to or output from a Process or the flow of data within the Process itself. External Agents are connected by Data Flows to the Process.

Data Store means data produced by a given Process which is preserved or stored and is made available to other Processes or subsequent execution of said given Process.

Entity means a general topic of data which is normally in the form of a person, place, thing, concept, or event about which users want to collect Information. Entities are characterized, described, or modified by data referred to as Attributes.

External Agent means a Data Store and Process that are outside the Process currently being modelled, but pass information to or receive information from the Process to be modelled.

Information is data accumulated to perform a project of Requirements gathering or of modelling a data flow or Process.

Object means a parent Process or offspring Process which are represented in a decomposition diagram.

Parent Process is a Process composed of one or more offspring Processes. In a hierarchy of Processes, a single Process may be a Parent Process composed of offspring Processes and may also be an offspring Process that, together with other Processes, compose a higher level Parent Process. Parent Processes and offspring Processes are related in a hierarchy that provides successive layers of detail.

Process means a defined business method, procedure, activity, or task that is repeatable.

Property means a characteristic of an attribute, such as a Cardinality.

Requirements are data needed to achieve or define a specified project, such as preparing a software application that performs desired functions or automating an office or plant procedure.

2. Description of Sample Computer-based Information Engineering Tool to Which Invention Provides Input A preferred computer-based information engineering tool to which the present invention provides input, as a front end, is Knowledgeware ADW. ADW is a product that processes stored data to generate a process model or data model in an information engineering environment.

ADW data is stored in encyclopedias which contain files of four different types, from which data can be accessed and model diagrams can be built. The four types of files are:

OI.EXP (Object File); AI.EXP (Association File); PI.EXP (Property File); and TI.EXP (Text File). Each file contains a different type of stored item.

An Object File record includes 52 characters: 1–11 are integers representing a token (or identifier) for the Object; 13–17 are integers representing an type code corresponding to the token; and 20–51 are characters representing the name of the Object. The characters at the 12th, 18th, and 19th positions are delimiters (e.g., comma or quotation marks). The first character of an Object File must be a "1". For example, an Object INSTRUCTOR could have a token "10000000003" followed by an Object type "10007", which is, in turn, followed by the name "INSTRUCTOR" (which is enclosed by quotes). The entire record would read:

10000000003,10007,"INSTRUCTOR ... "

where . . . represented filler blanks up to character 51.

Another example of an Object is:

10000000004,10007,"CLASS ... "

Other sample Object types with corresponding type codes might include:

| OBJECT | TYPE CODE |
| --- | --- |
| CRITICAL ASSUMPTION | 10039 |
| FUNCTION | 10058 |
| INFORMATION NEED | 10041 |
| PROBLEM | 10031 |

It is noted that each Object type begins with the numeral "1".

An Association File record defines relationships or associations between Objects defined in the Object File and/or associations between associations defined in the Association File. The Association File record includes 41 characters: characters 1–11 are integers (beginning with a "2") that represent the token or identifier for the particular association; 13–17 are integers (starting with "2") that represent the Association Type; 19–29 are integers that represent a unique FROM Token identifying the Object or association that is the source of the relationship or association; and 31–41 are integers that represent a unique TO Token identifying the Object or association to which the relationship or association is directed. The FROM Tokens and TO Tokens can be defined in the Object File or Association File—in the former case, the token begins with a "1" and in the latter it begins with a "2".

An example of an Association File record for a "relationship type" of association corresponding to "Class is taught by Instructor" follows:

20000000022,20044,10000000004,10000000003

In this example, 20044 indicates that the association is of the "relationship type"; 20000000022 is the token identifying the specific relationship type, for example the relationship between two specific Objects; 10000000004 is the token representing "CLASS"; and 10000000003 is the token representing "INSTRUCTOR."

It is noted that the INSTRUCTOR token and CLASS token are the same as set forth in the Object File record described above.

The third type of file, the Property File, includes records that describe properties for Objects and relationship types. Each Property File record contains 58 characters and associates a property type and a value with tokens in the Object File or Association File. The first eleven characters (1–11) are integers that identify a token for an Object or association; characters 13–17 correspond to the property type code which must begin with a "3"; 19–23 which are all zeroes; and 26–57 which describes in text or numbers the property.

Reference is again made to the foregoing example of "Class Is Taught by an Instructor." Suppose it is intended that the class be taught by no more nor less than 1 instructor. These maximum and minimum values are properties of the relationship between the Instructor and the class. Suppose that 30034 is the property type representing a "FROM-TO" property, that is a property extending from one item to another. Suppose that 30035 represents "FROM-TO MINIMUM CARDINALITY" whereas 30036 represents "FROM-TO MAXIMUM CARDINALITY".

The following Property File records correspond to "Class is taught by a minimum of 1 instructor and a maximum of 1 instructor":

20000000022,30034,00000,"IS TAUGHT BY         "
   20000000022,30035,00000,"1                    "
   20000000022,30036,00000,"1                    "

Similarly, to express the notion that the "Instructor teaches a minimum of one class and a maximum of many classes" the following property records would be stored:

20000000022,30034,00000,"TEACHES              "
   20000000022,30035,00000,"1                    "
   20000000022,30036,00000,"M                    "
        where "M" stands for "many".

The last file in the ADW encyclopedia is the Textual Property File, TI.EXP, which defines comments and definitions for Objects and relationship types. Records in this file associate a property type and value with tokens defined in the Object File or Association File. Each record includes 98 characters. The first 11 are integers corresponding to an identified token for an Object in the Object File or a relationship type defined in the Association file. The five characters 13–17 are integers corresponding to 30076 for a definition or 30077 for comments. Repetition Number characters 19–23 can have a value from 1 to 5. The remaining characters 26–97 contain a long textual property value. If more than 72 characters are needed for a definition or comments, it can flow to the next record by using a next Repetition Number. The first line of comments may have a 00001 Repetition Number, while the second line of comments may have a Repetition Number of 00002. By way of example, the definition for the token 10000000004 (i.e., identifier for CLASS) as a "Group of Students . . . meeting to participate . . . " would be represented by:

100000000004,30076,00001,"Group of ...       "
   100000000004,30076,00002,"meeting to ...     "

The above four files, referred to as flat files, are required by Knowledgeware's ADW to generate process models and data models.

Typically, the computer-based information engineering tool prompts the user to enter the Information needed to generate the four files. However, only one user enters the Information. Moreover, the inputs are highly formatted and require the user to have experience and expertise in Knowledgeware ADW in order to enter the information. Hence, the user entering data must be versed in both the project to be performed and in the tool being used or must acquire the Information from others.

3. Description of Inventive Front End to Computer-based Information Engineering Tool A. Hardware Configuration and Operation Referring to FIG. 1, a local area network (LAN) 100 is shown having terminals 102 through 110 connected thereto. Each terminal 102 through 110 is preferably an IBM* 8590-OL9 PS/2* Model 90 XP486. Each terminal 102 through 110 has a respective display 112 through 120. Each display is preferably an IBM PS/2 8515 color display. The LAN 100 is preferably a token ring network 16/4. The terminals 102 through 110 are connected to the LAN 100 with an appropriate cable (not shown) and preferably are installed with a PS/2 4 MB memory modification kit and a 3990 Enhanced KBRD English (US). A mouse (not shown) is provided with each terminal and operates in the standard manner.

Terminal 102 is an "analyst" terminal which has a unique configuration and is allowed to perform operations unavailable to the other terminals 104 through 110. For example, the analyst terminal 102 is used to identify users that can attend a specific project. Other special features of the analyst terminal 102 are discussed below.

Also connected to the LAN 100 is a server 130. The server 130 is preferably an IBM 8590-OLF PS/2 Model 90 XP 486 equipt similar to the terminals 102 through 110, except that it includes a server adapter (not shown) which is preferably a 4041 Token Ring Network Adapter 16/4 IBM Server ADP/A and is not provided with a mouse. The server 130 has a centralized database 132 and is connected to a printer 134. Reports, based on data stored in the database 132, can be printed at printer 134 with an appropriate input command from terminal 102 (or, in some instances, other of the terminals).

The analyst terminal 102 has a number of tools installed that other terminals 104 through 110 do not. The analyst terminal 102 includes a a decomposition diagrammer, dataflow diagrammer, entity relationship diagrammer, entity type diagrammer, and minispec action diagrammer. (It is noted that a dataflow describes an overall flow of data that is made up of elements referred to as Data Flows.) These tools are typically available in a computer-based information engineering tool 136 which is accessed through a bridge program 138. The bridge program 138 converts table data stored in database 132 into a format strictly dictated by a computer-based information engineering tool 138, such as ADW. That is, data stored in the database 132 is exportable through the bridge program 138 into the computer-based information engineering tool 136.

Connected to the analyst terminal 102 is a projector 140 with a projector screen 142 for displaying to all users the contents of the analyst's display 112. A preferred projector model is the BARCO projector which projects onto a screen the display of a terminal.

B. Operation

Figure 2:
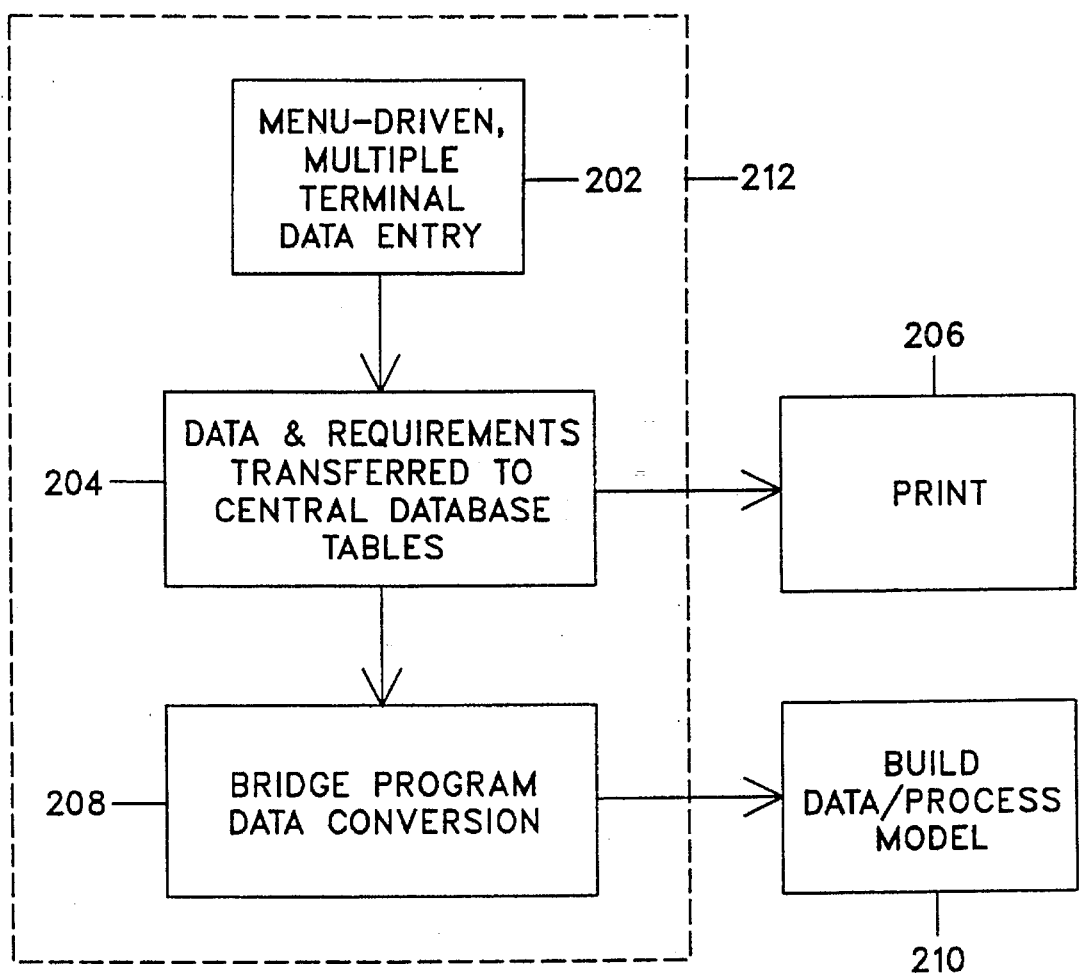
FIG. 2 is a flow diagram showing how data used in building models is gathered and formatted for export.

Referring to FIG. 2, the general operation of the invention is illustrated. In step 202, users at terminals 102 through 110 (of FIG. 1) enter data onto the LAN 100 (of FIG. 1) in response to menu screens. Depending on the screen input to which the user is entering input, at step 204, the data or Requirement is transferred to an appropriate location in a table in the database 132 (of FIG. 1). These Requirements can then be printed and/or categorized.

For example, suppose the user is at a screen with a box in which the user can add a new Component. When the user enters the name of the Component in the box, the data is transferred to a table of Components that pre-exists in the database 132 (of FIG. 1). In this regard, each time a project is set up, a Component table for the project is set up in the database 132 (of FIG. 1). By way of further example, suppose the analyst has a screen that asks whether the Component is an Entity or Attribute, and the analyst, based on user comments, enters "Entity" at terminal 102 (of FIG. 1). That Information is conveyed to the database 132 (of FIG. 1) and is stored in a pre-existing "Entity" table stored for the project.

The gathered Information may be printed out in step 206 as a report. Also, the gathered Information may be directed in step 208 through the bridge program (138 of FIG. 1) to convert the gathered Information into a format that the computer-based information engineering tool (136 of FIG. 1) can recognize. In step 210, the computer-based information engineering tool generates a desired model, such as a decomposition diagram, data flow diagram, or the like. Steps 202, 204 and 208 can be viewed as a novel front-end 212 of the present invention; that is, a front-end 212 for gathering natural language input from a plurality of users at respective terminals on a network and converting it into a format that existing computer-based information engineering modelling tools can import.

It is noted that for different information engineering tools, different bridge programs may be required. However, the input to all bridge programs are the same Requirements and data gathered and stored in the centralized database (132 of FIG. 1) and the exportable output must be in terms of Entities, Attributes, External agents, Cardinalities, Data Flows, Data Stores, and Parent Process group hierarchies, which are typically required by computer-based information engineering tools. A specific bridge program is described below.

Figure 3:
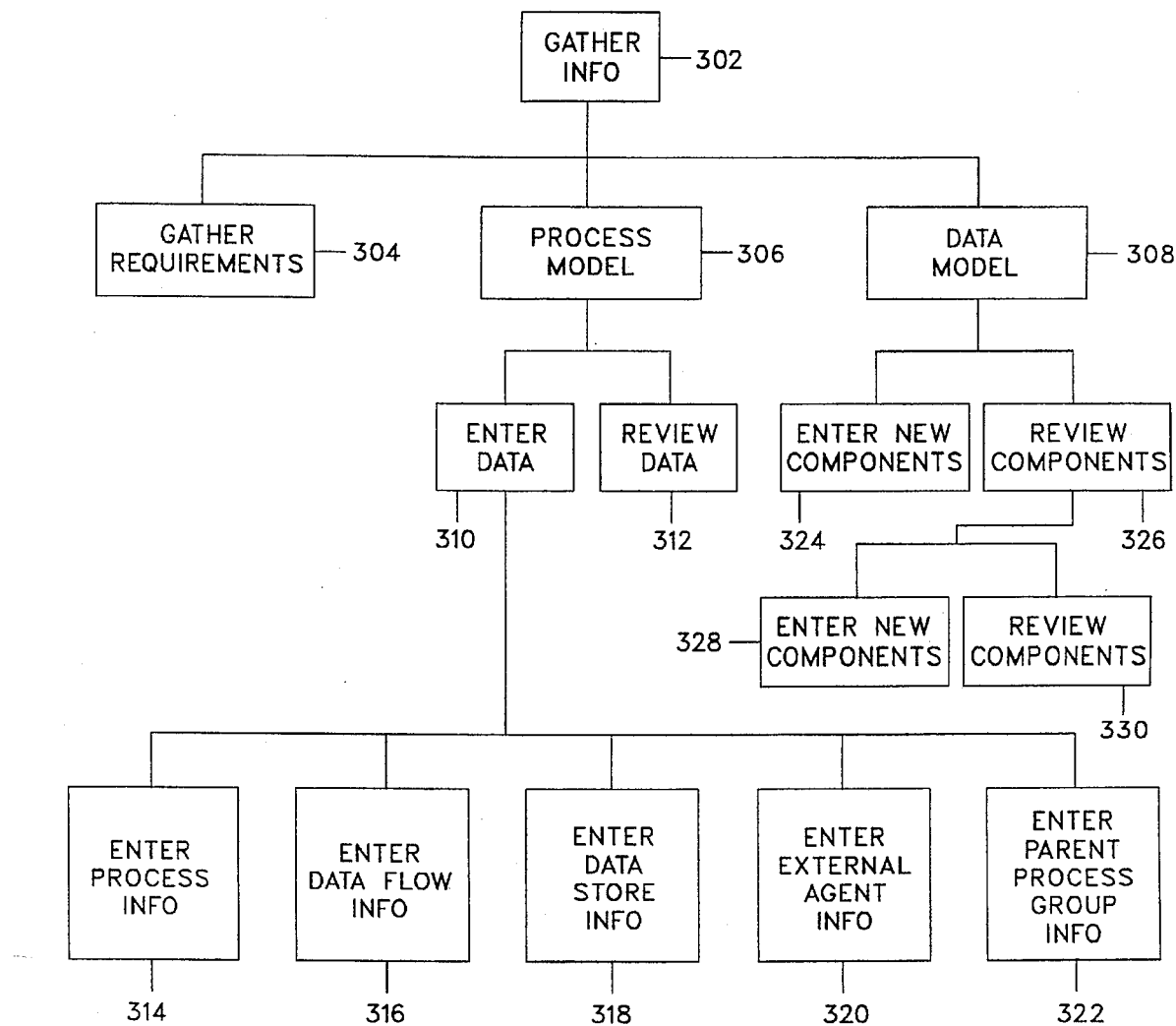
FIG. 3 is a decomposition diagram showing Processes included in the invention.

Referring to FIG. 3, a decomposition diagram shows successive levels of detail involved in accumulating Information according to the present invention. Gathering Information 302 is the highest level of Process and is a parent to three constituent offspring Processes: gathering Requirements 304, gathering Information for building a Process model 306, and gathering Information for building a data model 308. Requirements define what the participants expect the final result of their project to achieve. Modelling a Process involves defining the various Processes relating to the project in terms of data flowing into and from the Process, relationships between Processes, and relationships with agents external to but employed in the Process being modelled. The modelling of dataflow involves the tracking of incoming and outgoing data as it flows between Processes themselves or between Processes and external Data Stores.

Figure 4:
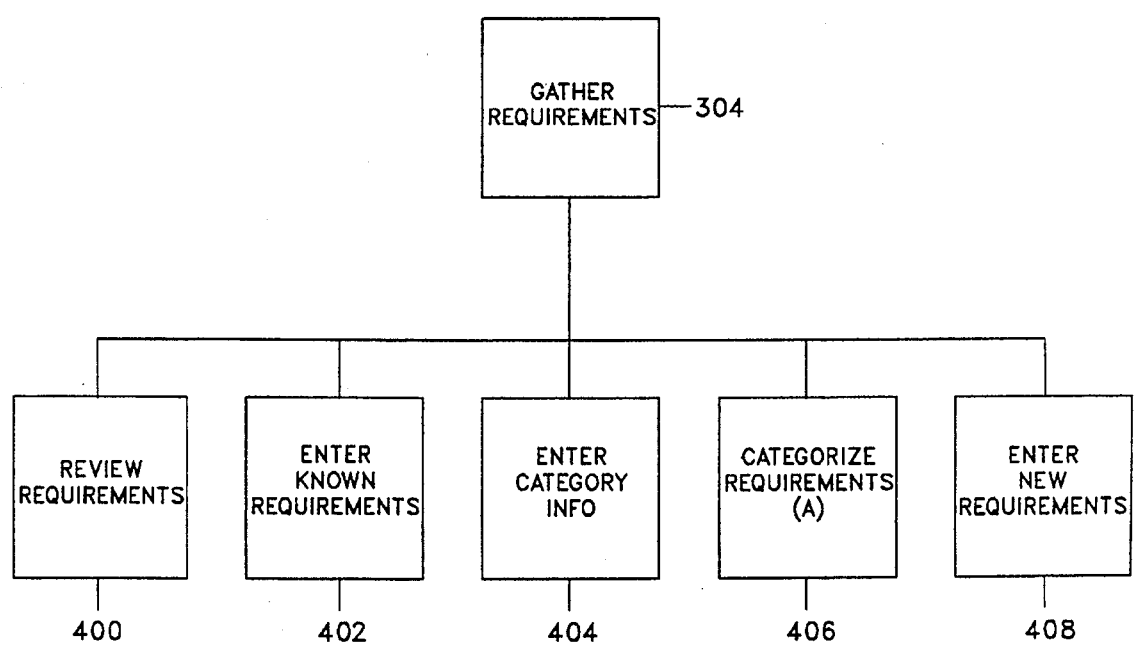
FIG. 4 is a decomposition diagram which shows the Processes that compose the "Gathering Requirements" Process.

Processes that compose the Process of "gathering Requirements" 304 are shown in FIG. 4. Process 400 involves "reviewing Requirements" in which users are displayed a list of previously entered Requirements. The users discuss and propose editing changes, which can modify or delete Requirements on the list. The changes can be entered only at the analyst machine (102 of FIG. 1). This helps ensure that a common set of data understood by all users is stored in the database 132 (of FIG. 1). Process 402 involves "entering known Requirements" that may have previously been defined or imposed on the group. In Process 404, certain categories are defined into which Requirements may be grouped. In Process 406, users discuss and propose which requirements fit within which defined categories. Categories need not be exclusive; one Requirement can fit into more than one category as the users may determine. In Process 408, new requirements can be entered by the users. Requirements and category Information, as entered by users or modified by analyst input, is stored in a project database using the services of a database manager (in the preferred embodiment the OS/2 Database Manager).

Figure 5:
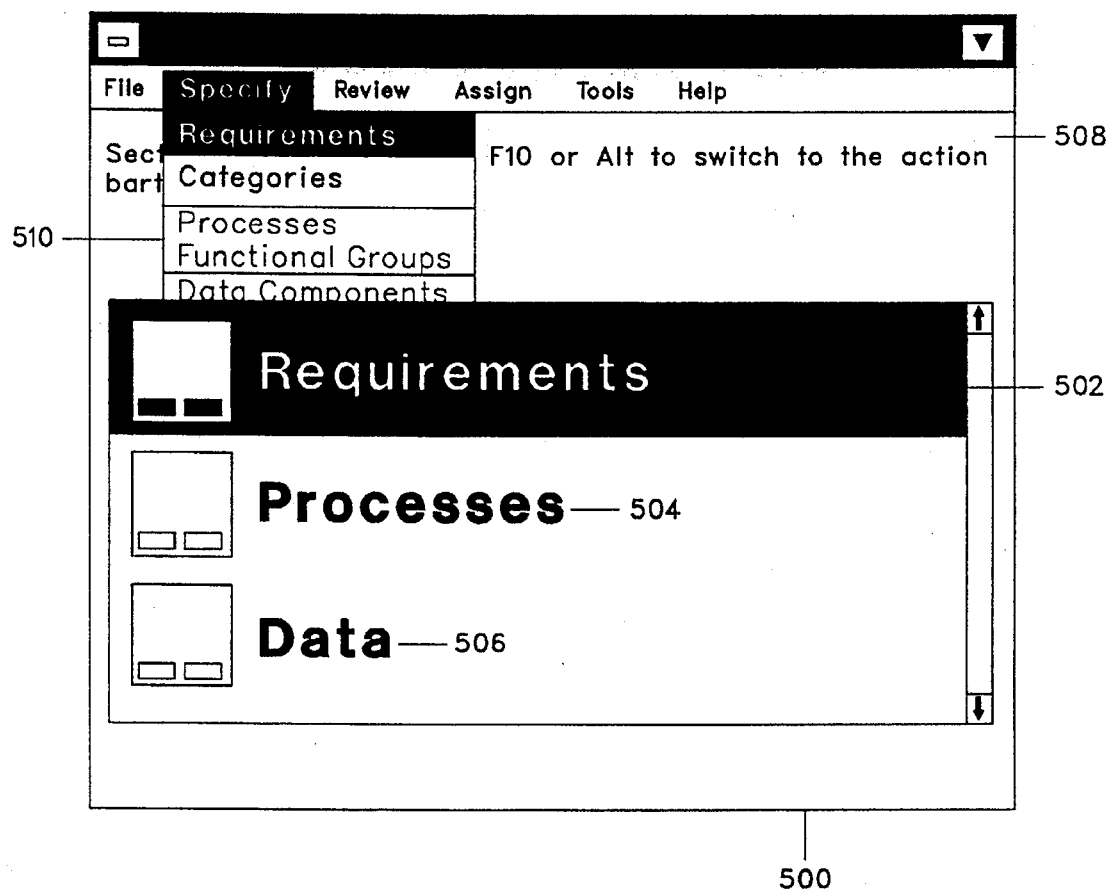
FIG. 5 represents a menu screen available to multiple users of the invention.

Each Process is accomplished by users responding to appropriate menus displayed at their displays (114 through 120, respectively, of FIG. 1). For example, a user screen 500 is shown in FIG. 5. In FIG. 5, three decisions have been entered. It is first noted that the three major activities that can be performed are shown in the lower half of the screen 500: gathering Information for Requirements 502, Processes 504, and Data 506. The Requirements option 502 (obscured in the figure) has been selected. The screen 500 also includes a horizontal menu bar 508 that lists FILE, SPECIFY, REVIEW, ASSIGN, TOOLS, HELP choices. The TOOLS choice is hatched and hence not available to the user's machine at this time. The SPECIFY choice is darkened to indicate that it has been selected. A pull-down window 510 is shown under the SPECIFY selection. Although six items are readable in the window 510, only the top two REQUIREMENTS and CATEGORIES are available for selection, given the earlier choices. It is noted that PROCESSES and FUNCTIONAL GROUPS (i.e., Parent Process Groups), are choices available when Process modelling is being performed; and that DATA FLOWS and DATA COMPONENTS are available when dataflow modelling is performed.

Screen 500 is representative of screens used in the present invention. Such screens are preferably generated in accordance with the IBM operating system OS/2.* The creation of menus, menu bars, pull-down windows, and the like are described in the Programming Guide for the operating system "IBM Operating System/2* Programming Tools and Information Version 1.2" at chapters 11, 14, 15, and 16. Specific programming routines for achieving such screens are provided in the Guide.

*Operating System/2 and OS/2 are registered trademarks of the IBM Corporation.

Referring again to FIG. 3, the layers of Processes related to the gathering Information used in modelling Processes are shown. The second layer includes ENTER DATA 310 and REVIEW DATA 312. The more detailed Processes of ENTER DATA 310 include ENTER PROCESS INFO (such as the Process name and Process description) 314, ENTER DATA FLOW INFORMATION 316, ENTER DATA STORE INFORMATION 318, ENTER EXTERNAL AGENT INFORMATION 320, and ENTER PARENT PROCESS GROUP INFORMATION 322. Under the Process of building a DATA Model 308, there is a next lower level of two Processes ENTER NEW COMPONENTS 324 and REVIEW COMPONENTS 326, with REVIEW COMPONENTS 326 having two offspring Processes DESCRIBE AND ASSIGN TYPE 328 and ASSOCIATE ATTRIBUTES TO ENTITIES 330.

Looking first at the Processes involved in gathering Information for modelling data, it is noted that some Components may be previously imposed while others may be entered by users in Process 324. The entering of Components (like the entering of Requirements described above) is accomplished by multiple users at terminals 102 through 110 (of FIG. 1) entering the data. The REVIEW Process 326, while relying on user discussion and consensus, permits input from only the analyst terminal 102 (of FIG. 1). That is, only the analyst terminal 102 (of FIG. 1) is programmed and configured to enter such data as is known in the programming field.

Under Process 328, Components are described and defined as an Entity or Attribute. While users may discuss which type applies to a given Component, only the analyst terminal 102 (of FIG. 1) can make the assignment. Similarly, while users discuss and form consensus on the matching of Attributes with Entities, the entry of such matching in Process 330 is permitted at only the analyst terminal 102 (of FIG. 1). The Entities and Attributes are stored in a database corresponding to the project being performed, and the association therebetween is also stored in the database. The database is preferably a relational database in which data is stored in tables.

Sample Components for a Process, relating to business personnel, are listed below in Table 1:

TABLE 1. SAMPLE COMPONENT LIST

EMPLOYEE
Employee First Name
Employee Last Name
Employee Middle Initial
Employee Address Line 1
Employee Address Line 2
Employee Address Line 3
Employee City
Employee State
Employee Zipcode
Employee Department
Employee Division
Employee Internal Zip
Employee Serial Number
Employee Tie-line
Employee Nodeid
Employee Start Date
Employee Information
Employee End Date
Employment Status
MANAGEMENT
Manager Name
Manager Tie-line
Manager Nodeid
Manager Outside Line
Serial Number
Social Security Number
Spouse
SALARY
Salary Rate
Staff type
DEPARTMENT
Department Name
PROJECTS In Table 1, the Components in all capital letters represent Entities. The remaining Components are Attributes listed under associated Entities.

Data entered by users or analyst at terminals 102 through 110 (of FIG. 1) is directed to respective tables in the database (132 of FIG. 1). The tables, based on the user and analyst entries, indicate whether a data item is an Entity or Attribute, a Data Flow, a Parent Process, or the like. A sample table stored in database 132 follows:

TABLE 2

|  | Employee name | Address | Serial No. | Tel. no. |
|---|---|---|---|---|
| Employee 1 | ] | ] | ] |  |
| Employee 2 | ] | ] | ] |  |
| Employee 3 | ] | ] | ] |  |

In the above Table 2, it is assumed that input from the analyst terminal (102 of FIG. 1) identifies "employee" as an Entity and "employee name", "address", "serial number" and "telephone number" as Attributes. Processes stored in the database, as previously noted, are identified as Parent Processes, and offspring Processes thereof are noted as well. The hierarchy of Processes is stored in a linked list in the database 132.

A sample linked list looks as follows in Table 3:

TABLE 3

```
§
/***************************************************************/
/*       A component may be EITHER an attribute or           */
/*                    an entity but not both!                 */
/***************************************************************/
typedef struct _COMPONENT
{
    CHAR dbmErrCodeDesc          [DBMSGLENGTH];
    CHAR szCompDef               [257];
    CHAR szCompName              [32];
    CHAR szDFTypeName            [32];
    CHAR szCompDisp              ;
    sptrATTRIBTYPE sptrCOLNAME;
    sptrENTITYTYPE sptrTABLENAME;
    struct _COMPONENT *B4Comp:
    struct _COMPONENT *NextComp:
}COMPONENT, FAR *sptrCOMPONENT;
```

Referring again to FIG. 1, once the Information is stored in the database 132, the analyst terminal 102 can perform a number of functions. A simple print-out of the entered data can be requested from the printer 134. If DATA FLOW or PROCESS Information was entered, the analyst terminal 102 can also request to format the data to be exported to the computer-based information engineering tool 136 through the bridge program 138.

The bridge program 138 for ADW is shown in Appendix 1. A more detailed chart for preparing data gathered according to this invention for export to ADW or a similar tool is shown in Appendix 2. As noted in the program, the desired directory for the project is obtained and a parent link list, representing Process hierarchy, is obtained. The parent Process is assigned a "dummy" (or arbitrary) token which identifies it in terms that ADW recognizes for tokens. As noted previously, a 1000000000x corresponds to a token for an Object in ADW parlance, where "x" is a selectable digit. The parent token and name are then written to an OI.EXP file (10000) and the token plus description are written to a text file TI.EXP (30076). The file type designation corresponds to ADW conventions for providing file types. Associations between a Parent Process and another Process are assigned a token which is stored in an AI.EXP file (20034).

The bridge program 138 then looks to Data Flows. An Object token is assigned to a Data Flow (if one is not already assigned) and the newly assigned token is written to an OI.EXP file (10008). The token and description are written to the text file. A "to or from" token is then assigned if not already done so, based on the input relating to destination or source provided by the users (see steps 1114 and 1124 of FIG. 9). "To" and "from" correspond to source and destination data entered at the analyst terminal 102.

If the Object was identified as an External Agent or Data Store, it is given an Object type (10012). Otherwise, it is assumed to be a Process and is given an Object type (10000). The Association between the directional "to" or "from" Object and a Parent Process is assigned a token (if there is none) in a format recognizable by ADW; namely 2000000000x.

If the Object was identified during data entry as an External Agent, the Association is given a type 20001; if a Data Store, then type 20006; and if a Process, then type 20034.

New Association tokens are written to an Association export file AI.EXP. Tokens for various other Associations are assigned and written to the Association file with appropriate types.

In the data gathering described above, components are identified as Entities and Attributes. The bridge program 138 gets Entities associated with a Data Flow and then assigns a token to each Entity that is not previously identified with a token. The token is of the form 1000000000x and is written into OI.EXP file (10007), with the description being entered into TI.EXP (30076). A token is assigned to the Association between the Entity and Data flow (2000000000x) and written into AI.EXP with a type 20041.

Attributes are treated similarly. A token is provided for each Association between an Entity and an Attribute, and each Association between an Attribute and a Data flow. Maximum and minimum values, which were provided during data entry, are also written to the file. Further Information relating to data type is also written into the file. Data type includes a description of an Attribute.

The bridge program 138, by assigning tokens and types to the data, generates files ADW can recognize. The generated files can be transferred, or exported, to ADW which can provide any of various diagrams that it is designed to prepare. Upon request from the analyst terminal 102, ADW can import files generated by the bridge program 138 to produce a decomposition diagram (such as FIG. 1) or a data flow diagram as is shown in FIG. 6.

Figure 6:
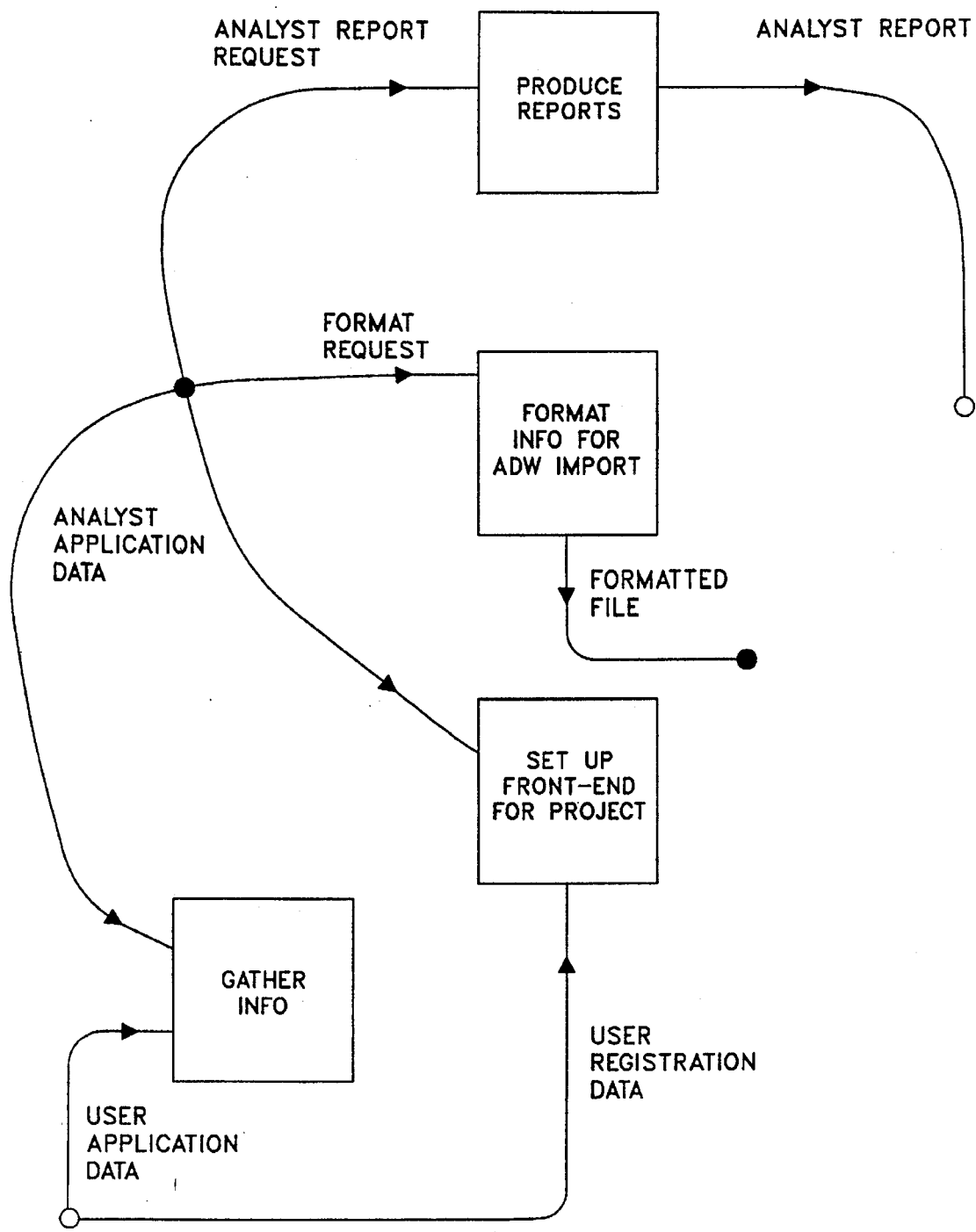
FIG. 6 is a data flow diagram showing the invention in terms of tasks to be performed and data involved in those tasks.

In FIG. 6, for Processes are shown, by way of example, for the present invention. In particular, Processes include: SET UP FRONT END FOR PROJECT, PRODUCE REPORTS, GATHER INFO, and FORMAT INFORMATION FOR ADW IMPORT. The data inputs to each Process are also identified.

Another diagram relating to Entity relationships can also be generated. Such diagrams are known in the art.

While the bridge program 138 described herein is directed to the ADW information engineering tool, other bridge programs may be implemented for other similar tools. The identification of types and the number of files in the encyclopedia may vary, but the required Information should remain substantially the same; namely, Entities, Attributes, External Agents, Data Flows, Parent Process groups, and Data Stores. Accordingly, while the bridge program 138 may differ for different tools, the Information gathering part of the invention and screens used in gathering Information should remain unchanged.

Figure 7:
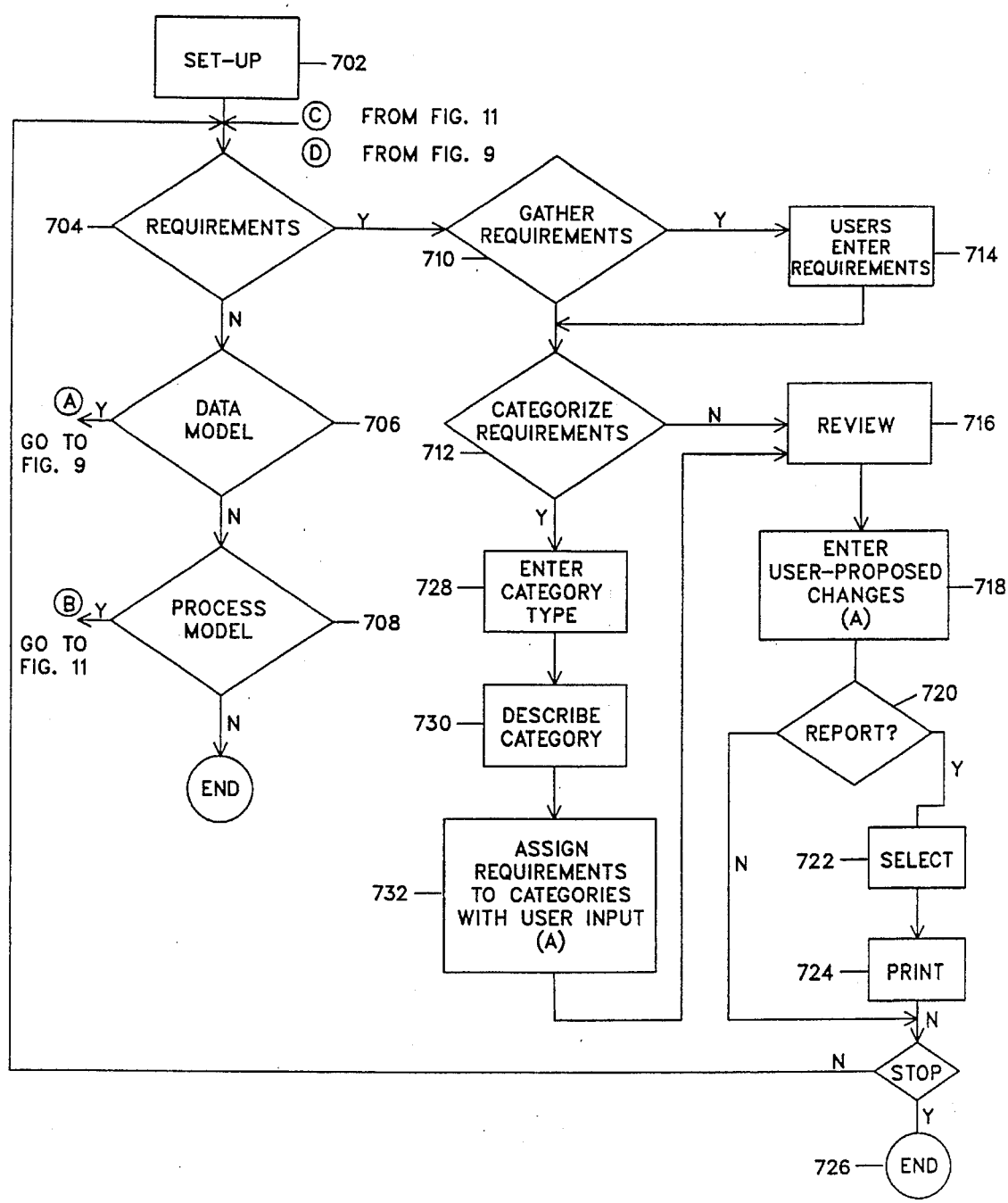
FIG. 7 is a flowchart outlining the steps of the invention, illustrating specifically steps involved in gathering Requirements.

In FIG. 7, a flowchart 700 is shown which follows steps performed when a project has been set up 702 and before the data generated and stored in the database 132 (of FIG. 1) is passed to the bridge program 138 (of FIG. 1). FIG. 7 shows one way in which the invention can be practiced.

In the set-up step 702, the analyst at terminal 102 (of FIG. 1) identifies the project to be performed; identifies users than can participate in the project; and performs administrative tasks. Users log in and provide data concerning themselves and the project to be undertaken.

Figure 8:
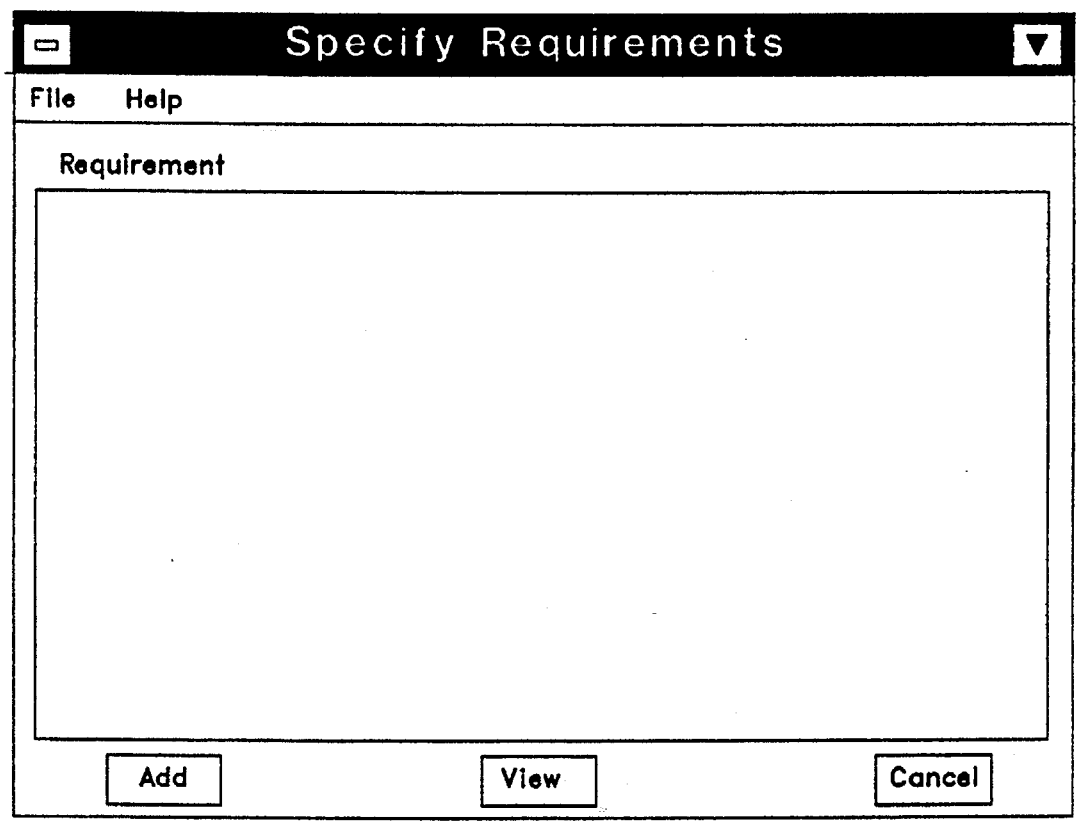
FIG. 8 is a menu available to multiple users who can enter Requirements data.

Following the set-up, Information relating to REQUIREMENTS 704, PROCESS MODEL 706, or DATA MODEL 708 can be selected. The analyst terminal 102 enables one of the three options so that all users are entering data for the same data items. If REQUIREMENTS 704 is chosen, the users determine if they should be GATHERING REQUIRE- MENTS 710 or CATEGORIZE REQUIREMENTS 712. If the former, the user at each terminal 102 through 110 (of FIG. 1) can ENTER REQUIREMENTS 714. The users see a screen at their displays 112 through 120 (of FIG. 1) like that illustrated in FIG. 8. In entering requirements, users specify their needs for a software application being developed, a procedure being established, or other project. After all requirements have been entered, a review of the Requirements entered by all users can be selected by entering REQUIREMENTS, then REVIEW, then REQUIREMENTS on the screen shown in FIG. 5 or the users can CATEGORIZE them at step 712 by entering REQUIREMENTS, then SPECIFY, then CATEGORIES on the screen shown in FIG. 5.

In the former case, during the review, the list of Requirements as it is updated is preferably displayed on the projector screen 142 (of FIG. 1) and can also be brought up on each user display 114 through 120 (of FIG. 1) by entering a REFRESH command shown on the screen of each user display 114 through 120 (of FIG. 1). In response to user proposals and consensus, changes to the Requirements can be entered at the analyst terminal 102 (of FIG. 1) as illustrated in step 716. The analyst terminal 102 (of FIG. 1) will have a screen including an option to request one of a variety of reports. Reports can include a listing of all Requirements and a listing of meeting participants. If there is to be a report (718), it is selected (720) and printed (722) by printer 134 (of FIG. 1). The session may terminate 726 or continue on to modelling a process and/or modelling data.

In categorizing Requirements at step 712, a category type is entered (step 728) and described (step 730). Requirements are assigned to categories in step 732 by the analyst (as suggested by the notation (A)) based on user input. Once entered the categories may be reviewed starting at step 716.

Figure 9:
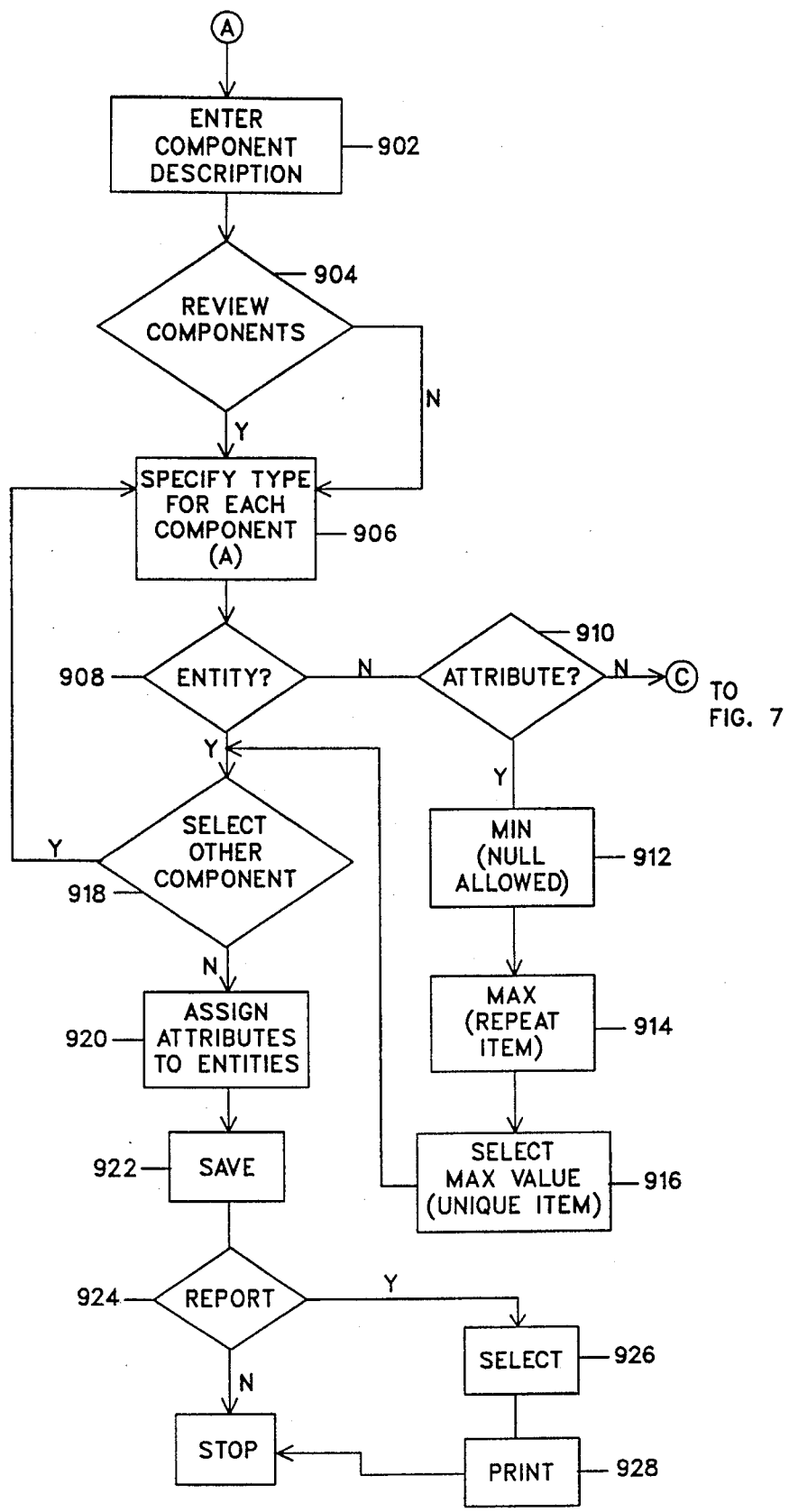
FIG. 9 is a flowchart illustrating specific steps in gathering dataflow data.

Referring to FIG. 9, the steps in modelling data are outlined. At step 902, Components are entered and described. An option is available to review the entered Components (step 904). In any event, the analyst, based on user comments, specifies Component type (step 906)—that is, whether the Component is an Entity (step 908) or Attribute (step 910). The users, prior to the data entry, are instructed as to the meaning of these terms if the terms are unfamiliar. If styled an Attribute, minimum and maximums and a maximum value are entered at steps 912, 914, and 916, respectively. These items indicate how often an item is expected to be seen or used in the task.

If values are not entered, defaults are provided.

All Components are defined as Entity or Attribute if they are to be exported to the computer-based information engineering tool 136 (of FIG. 1). After all Components have been selected (step 918), there is assignment of Attributes to Entities at the analyst terminal 102 in response to user comments (step 920). The results of specifying the Component types and of assigning Attributes to Entities are (at step 922) stored, for the project, in the database 132. If a report is desired (step 924), the appropriate report is selected (step 926) and printed (step 928). Activity may stop at that point, a new project may be entered into, or entered data can be revised by going back to the first step of FIG. 7.

Figure 10:
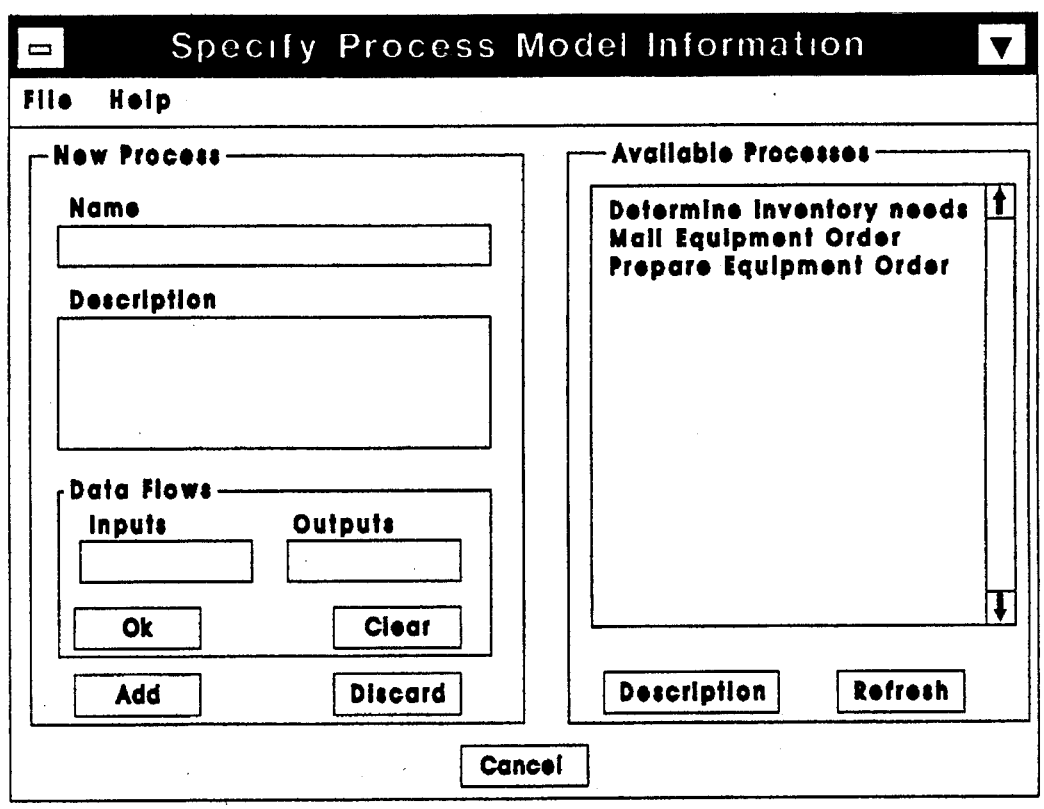
FIG. 10 is a menu used in specifying Process model Information.

Referring again to FIG. 7, performing Process modelling at step 708 may be selected whether no data modelling was performed or after data modelling. To make that selection, the user enters PROCESSES, then SPECIFY, then PROCESSES at the screen FIG. 5 (which features the main menus). The screen in FIG. 10 then appears with boxes for name, description, and Data Flows of a new Process.

Figure 11:
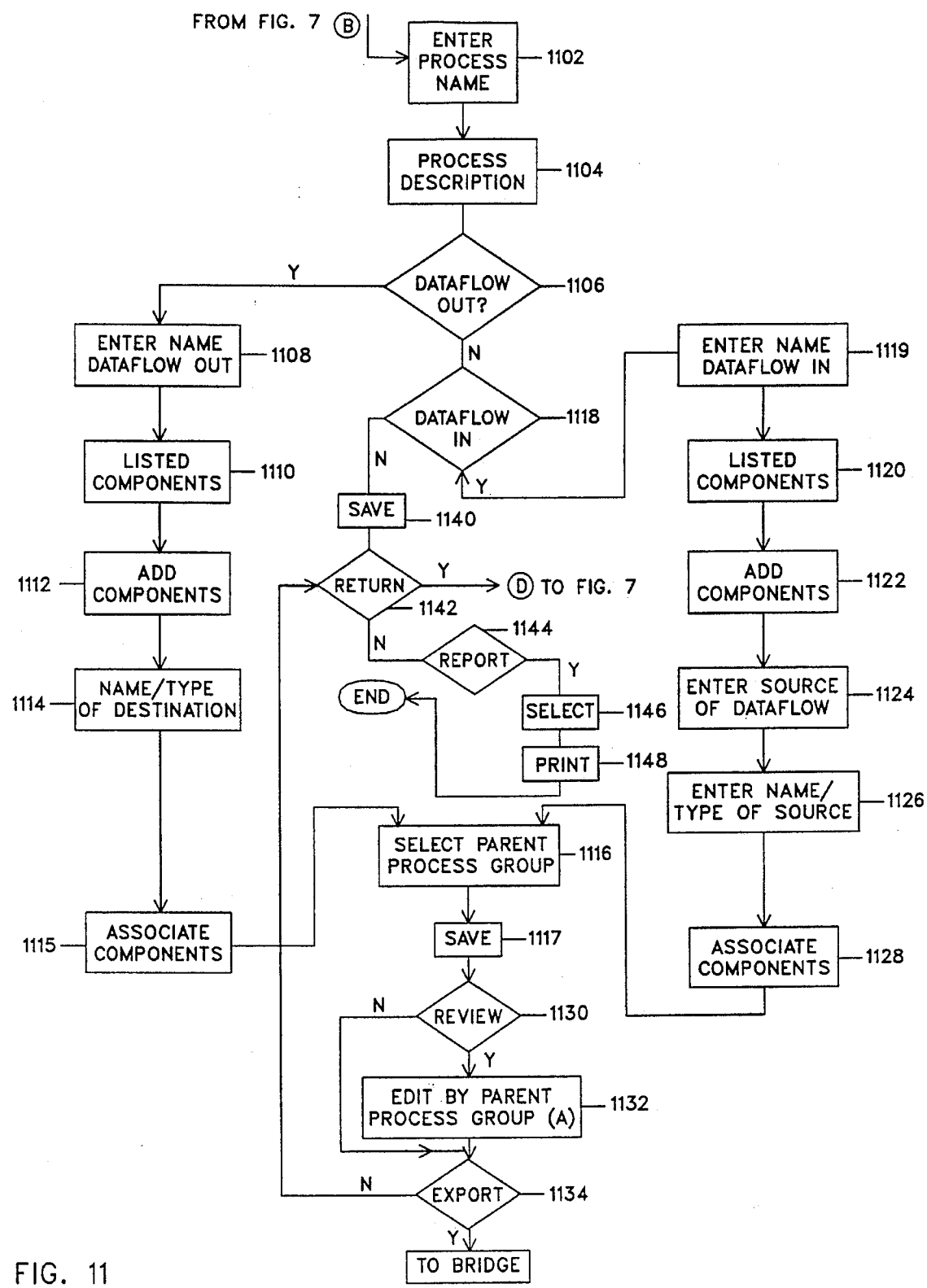
FIG. 11 is a flowchart illustrating specific steps in gathering and editing Process model Information that can be exported via a bridge program to an information engineering tool.
Figure 12:
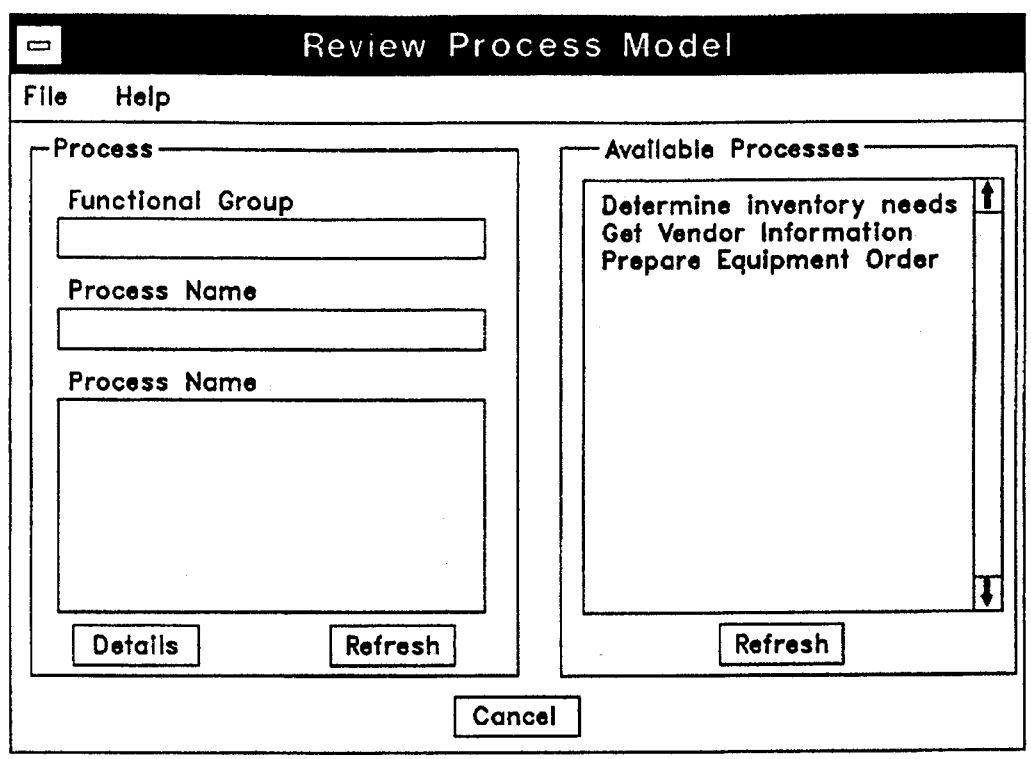
FIG. 12 is a menu available to users for adding Components.

Referring to FIG. 11, the user enters name and process description in steps 1102 and 1104, and then identifies data flow out (step 1106). For a Data Flow-out entry, screen FIG. 12 is displayed. A name is entered by the user onto screen FIG. 12 where a separate box for the name is included (step 1108). Components stored in the database are displayed on the user displays at step 1110 and, as users deem appropriate, additional Components are added (step 1112). A destination name and destination type are entered (step 1114) to define where the Data Flow is to go. In FIG. 12, for the data flow named "Vendor Record", there is a Component entitled "Vendor Region". The destination could be a Process, External Agent, or Data Store. Components associated with the Data Flow out should all be entered and specified, together with the above data (step 1115). At step 1116, a Parent Process group is selected for review. An appropriate screen is displayed when the user activates the ADD command on screen FIG. 10 after all Data Flow and Component Information is entered. A confirmation screen asks if the information is correct.

The results are saved at step 1117 by entering an appropriate command at the analyst terminal 102 (of FIG. 1)

The Data Flow-in procedure is similar to Data Flow-out and is shown in steps 1118 through 1128, except that the source rather than the destination of the Data Flow is sought.

Associated Components then go through steps 1116 and 1117 enroute to step 1130.

Figure 13:
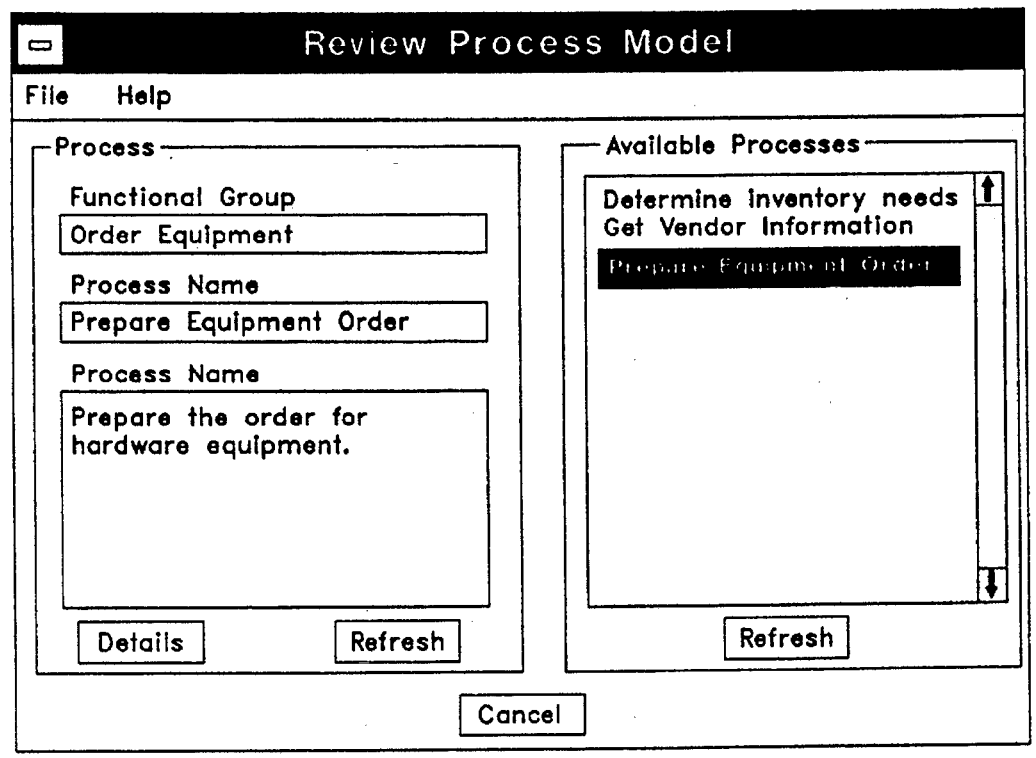
FIG. 13 is a menu used for reviewing Process model Information.

At step 1130, the entered Process model data can be reviewed. The review enables the users to propose modifications to the data entered. The entered data is preferably displayed on the projector screen 142 (of FIG. 1) and, upon user request, at the user terminal displays. Changes can only be entered at the analyst terminal 102. Starting at a screen FIG. 13, the users can propose changes based on Parent Process group. Referring to the sample data in FIG. 13, the Parent Process group "Order Equipment" includes a Process "Prepare Equipment Order". Other Processes in the group are shown as "Determine Inventory Needs" and "Get Vendor Information". By entering the command DETAILS, screen FIG. 14 is displayed which depict a Process in greater detail.

Associated Data Flows, Data Flow types (that is, destination type or source type), and available Components are displayed. Based on user input, the displayed data may be modified or deleted at the analyst terminal 102 (of FIG. 1). By clicking a mouse (not shown) when pointing at the Data Flow named "Equipment Order" in FIG. 14, the screen of FIG. 15 is displayed. Modifications to the Data Flow can be effected at the analyst terminal 102 (of FIG. 1). If the DESCRIPTION button is entered at the screen of FIG. 15, the screen of FIG. 16 will appear to show whether a Component selected from either the Associated Component List or the Available Component List is an Entity, Attribute, or yet Unassigned.

Referring again to FIG. 11, after editing Processes and Components thereof in step 1132, the results can be readied for export (step 1134). The analyst terminal 102 (of FIG. 1). The analyst terminal 102 (of FIG. 1) enters an input that directs the gathered data to the bridge program 138, which performs the appropriate conversion.

If there is no Data flow-in (step 1118), the data already generated can be saved (step 1140). Step 1142 corresponds to returning to the initial step (and menu) of FIG. 7. Alternatively, if a report is desired (step 1144), the appropriate report is selected (step 1146) and printed (step 1148). Activity may stop at that point, a new project may be entered into, or entered data can be revised by going back to the first step of FIG. 7.

The invention further includes a reverse bridge program (not shown) which can be used to take Information from a computer-based information engineering tool 138 and reformat it to be processed by the front-end of the present invention. In particular, Information would be transferred to appropriate tables in the centralized database 132 so that multiple users can enter further Information or be involved in the editing of the Information entered from the computer-based information engineering tool 138. The revised Information can then follow the steps set forth in the flow chart outlined in the above-discussed figures.

While the invention has been described in terms of a preferred embodiment in a specific environment, those skilled in the art would recognize that the invention can be practiced, equivalently or with modification, within the spirit and scope of the appended claims.

APPENDIX 1

/* Create KWARE import file from FIGARO database*/

Get destination directory from user

Get all processes and assign suffixes to any that have duplicate names.

Get all data flows and assign suffixes to any that have duplicate names.

Get Parent Linked List
Do while Pointer to next parent is not null

Assign Parent Token (1000000000x)
    Write parent token and name to OI.EXP file (10000)
    Write parent token and description to TI.EXP file (30076)

Check all Processes for this parent

Do while pointer to next process is not null

Get process id
        Assign or find token for process (1000000000x)
        Write new process token and name to OI.EXP file (10000)
        Write new process token and description to TI.EXP file (30076)
        (A)Assign or find association token - parent to process
            (2000000000x)
        Write new assoc tokens to AI.EXP file (20034)

Do while pointer to next data flow is not null

Assign or find token for data flow (1000000000x)
            (D)Write new token and name to OI.EXP file (10008)
            Write new token and description to TI.EXP file (30076)
            (o)Assign or find token for 'to or from' object (1000000000x)

If object is external agent then object type code = 10002
            Else
                If object is data store then object type code = 10012
                Else object is process and object type code = 10000

Write new object token and name to OI.EXP file
            (B) Assign or find assoc. token between 'to' and the parent
                (2000000000x)

If object is external agent then assoc type code = 20001
            Else

If object is data store then assoc type code = 20006
                Else object is process and assoc type code = 20034

Write new assoc tokens to AI.EXP file
            (C) Assign new assoc. token between (A) and (B) (2000000000x)
            Write new assoc tokens to AI.EXP file (20040)
            Assign assoc token between (D) and (C) (200000000x)

-35-

```
Write new assoc tokens to AI.EXP file (20020)

Get entities associated with the data flow

Do while pointer to next entity is not null
   Assign or find token for entity (1000000000x)
   Write new entity token to OI.EXP file (10007)
   Write new entity token and description to TI.EXP file (30076)
   Assign or find association token between entity and dataflow
      (2000000000x)
   Write new association token to AI.EXP file (20041)

Get attributes associated with the entity

Do while pointer to next attrubute is not null

Assign or find token for attribute (1000000000x)
      Write new attribute token to OI.EXP file -name is blank
         (10003)
      Write new attribute token and description to TI.EXP file
         (30076)
      Assign or find token between attribute and entity
         (2000000000x)
      Write new assoc token to AI.EXP file (20007)
      Assign association token between attribute and dataflow
         (2000000000x)
      Write new association token to AI.EXP file (20042)
      Write attribute minimum per subject to PI.EXP file (30007)
      Write attribute maximum per subject to PI.EXP file (30008)
      Write attribute maximum per value to PI.EXP file (30009)
      Write attribute name to PI.EXP file (30011)
      Assign or find token for global data type for this attribute
         (100000000x)
      Write new token to OI.EXP file (10016)
      Assign of find assoc token between attribute and local
         data type (2000000000x)
      Write new assoc token to AI.EXP file (20068)
```

-36-

APPENDIX 2

Fig Export Program  FIGXPORT.C

* FIGXPORT  - Extract data from the Fig   database and format into
    character delimited import file for KWARE.

Setup PM environment

InitializeTheExportProcess
      Get storage for Export variable structure (ptrExpOpts)
      Setup default export name from Fig   environment variables Do Put 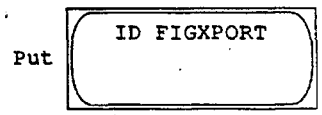

Get 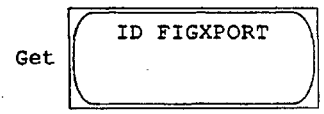

If user selects Exit from File pull-down or the Exit push button
          exit program If user selects Tracking File from Review pull-down If file doesn't exist
              display PM message
              return to main panel Open Tracking File Get number of records
          Get buffer for all records
          Read all records into buffer Do
              Put 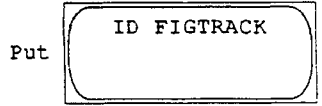

-37-
Copyright IBM Corporation 1992
Permission is granted to make copies of this
Appendix 2 as part of this patent application or patent Fig. Export Program    FIGXPORT.C until user selects Exit from Tracking File Pull-down or Exit butt Return to main panel If user selects OK button or presses Enter (FIGKWARE)
   Setup Figxport Icon and pointer If new path data entered
      create new target directory
   Else
      use default target directory If prefix specified
      save prefix in ptrExpOpts
   Else
      clear prefix in ptrExpOpts Open Tracking File
      File name is 'FX' followed by six numbers for the time HHMMSS
      File extension is 'MSG'
      Write Header information to File Get storage for beginning link list blocks
      ptrProcListFirst - Processes with renames
      ptrDFlowListFirst - Data Flows with duplicate names Check for duplicate processes Get storage for link lists ptrProcFirst - Processes from database
        ptrDFlowFirst - Data Flows from database Get all the processes call dbmGetProcInfo For each process

-38-

FIG    Export Program    FIGXPORT.C

```
If new process name
   get storage for process block   (ptrProcList)
   save name in block
   save description in block
   save process id in block
   save parent id in block If current process is duplicate name (different proc id)

If last process name already renamed
      add one to process name suffix
   Else
      set suffix on previous process name to 1
      set suffix to 2

Setup new name of current process with suffix set result = 556

Check for duplicate data flows (different dflow id)

Get storage for link lists
     ptrDFlowFirst

For each data flow under this process look for duplicate name in ptrDFlowThis list If duplicate name already in linked list If data flow id different
            increase suffix number - add new name for bridge
            add to linked list (ptrDFlowThis)
         Else
            skip data flow Else
       add to linked list (ptrDFlowThis)
```

Fig   Export Program    FIGXPORT.C

If at end of process list

Remove unique data flow name from ptrDFlowThis list
    (suffixes = 0)

Write all duplicates to tracking file with new name
    for bridge .

If duplicate data flow names exist (ptrDFlowListFirst)

If result = 556 (duplicate process names exist)
        set result = 557 (message for both)
    Else
        set  result = 558 (message for just data flow names)

Free the storage for the processes (ptrProcFirst)
Free the storage for the data flows (ptrDFlowFirst)

If duplicate process names or data flow name (556,557,558)

inform user and request continue or cancel

Put 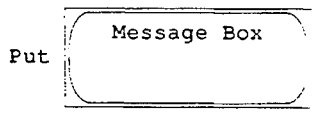

If user requests cancel
        return to main panel

Check for unassigned components

-40-

Fig  Export Program    FIGXPORT.C get storage for linked list
      ptrCompFirst get all components
      dbmGetAllCompInfo For each unassigned component (szCompDisp = DBMCOMPU)
      add to linked list (ptrDTACOMPNew)
      set rc of 566

If result = 566 (duplicates)

get all data associated with the duplicate components
          dbmGetCompStatInDFlow For each duplicate component If associated data found ElsWe If unassigned components exist (566)

inform user and request continue or cancel

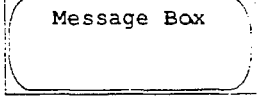

If user request cancel
        return to main panel

FIG    Export   Program   FIGXPORT.C

Create export file records

Create fully qualified path for export files

Open all output files (AI, OI, PI, TI)

Write names of out files to tracking file get storage and setup pointers for export record structures
            ptrExp->ptrAI   (associations)
            ptrExp->ptrOI   (objects)
            ptrExp->ptrPI   (properties)
            ptrExp->ptrTI   (text)

get storage for linked list
            ptrParFirst - parents get all parents
            dbmGetAllParents if no parents
                setup error message and display in message box
                return to main panel get storage for linked lists
            ptrCurrTok - token information
            ptrAssFirst - associations For each parent
            Assign object token and write to OI file (10000)
            Write description to TI file (30076)

read through process linked list (ptrProcListThis)

For each process with this parent id

Setup process info
                    Assign/find object token for process
                    Write new process token and name to OI file (10000)
                    Write new process token and description to TI file (30076)

-42-

Fig.  Export Program    FIGXPORT.C

```
            Assign or find association token - parent to process
            Write new assoc. token to AI file (20034)

get storage for data flow calls
            ptrFlowFirst - data flow
            ptrFlowTypeFirst - data flow type
            ptrCompFirst - components
            ptrEntFirst - Entities
            ptrAttFirst - Attributes get all data associated with this process
            dbmGetAsocDTAFLOW For each data flow
         look for name in list of duplicate data flows (ptrDFlow]

If in duplicate list
               use rename for export
            Else
               use figaro name setup data flow info
               Assign/find object token for data flow
               Write new token and name to OI file (10008)
               Write new token and description to TI file (30076)

For each data flow type
               setup data flow type info
                  If Data Store
                     Object Type = 10012
                     Association Type = 20006
                  Else if Process
                     Object Type = 10000
                     Association Type = 20034
                  Else if External Agent
                     Object Type = 10002
                     Association Type = 20001

Assign/Find object token for data flow type
                  Write new token and name to OI file
```

-43-

FIG    Export Program FIGXPORT.C

Assign/find association token - data flow type to
Write new association to AI file Associate parent/process to parent/data flow type If Flow direction is "IN"
       set From Token = parent/data flow token
       set To Token = parent/process token
    Else
       set From Token = parent/process token
       set To Token = parent/ data flow token Assign/Find association token
    Write new association token to AI file (20040)

Associate data flow to parent/process/parent/data
    Assign/Find associate token
    Write new association token to AI file (20020)

For each component (must be assigned)

If component is entity
       Assign/Find object token
       Write new object token to OI file (10007)
       Write new object description to TI file (30076)

Associate entity to data flow
          Assign/Find Association token
          Write new association token to AI file (20041)

Else component is attribute
       Assign/Find object token
       Write new object token to OI file (10003)

Associate attribute to entity
          Assign/Find association token
          Write new association token to AI file (20007)

Associate attribute to data flow
          Assign/Find association token
          Write new association token to AI file (20042)

FIG   Export Program   FIGXPORT.C

```
                    If new attribute
                       Write attribute name to PI file (30011)
                       Write min per subject to PI file (30007)
                       Write max per subject to PI file (30008)
                       Write max per value to PI file (30009)
                       Assign/Find object token for global data
                       Write new object token to OI file (10016)
                        Associate attribute to global data type
                           Assign/Find association token
                           Write new token to AI file (20068)

Release Linked list storage
            ptrFlowThis
            ptrFlowTypeThis
            ptrCompThis
            ptrAttThis
            ptrEntThis Write totals for each type of record to tracking file
         Processes
         Data Flows
         Data Stores
         External Agents
         Entities
         Attributes Release Linked lists
      ptrFlowThis, ptrFlowTypeThis, ptrCompThis, ptrAttThis, ptrEntThis
      ptrParFirst, ptrTokFirst, ptrAssFirst, ptrCurrTok
```

-45-

Fig  Export Program  FIGXPORT.C

Close all export files until window is closed (Exit)

I claim:

1. A method of gathering Information interactively from an analyst and multiple users each being associated with a respective terminal on a network, said Information being gathered as input for a computer-based tool which generates Process models or dataflow models or both from data identified with token identifiers, said method comprising the steps of:

communicating successive common queries to a respective display at each user terminal;

users at the terminals selectively entering natural language Component inputs into a common database connected to the network, in response to a communicated common query;

presenting the Component inputs to the analyst terminal and, at the analyst terminal only, selectively editing of the entered Component inputs;

specifying, at the analyst terminal, whether an entered Component input is an Entity or Attribute and storing the Component in a corresponding Entity table or Attribute table in the database;

assigning Attributes to Entities and storing such assignments in the database;

assigning, under computer control, token identifiers to the stored Entities, Attributes, and assignments therebetween, wherein the token identifiers are of a format prescribed by a computer-based information engineering tool;

assigning and storing, in files corresponding to the files recognized by an information engineering tool, token identifiers for (i) Parent Processes and subsidiary Processes that compose each Parent Process, (ii) Data Flows, (iii) External Agents, (iv) Associations, (v) Entities associated with Data Flows, and (vi) Attributes associated with Entities;

associating all offspring Processes which compose a Parent Process and storing an association therebetween; and assigning, to Information assigned a token by a token identifier means, type codes that are prescribed by the information engineering tool.

2. The method of claim 1 comprising the further step of:

limiting, by inputs entered at the analyst terminal, which users are authorized to have queries communicated to them.

3. The method of claim 1 comprising the further steps of:

ascribing a functional hierarchy to Processes to indicate which subsidiary Processes constitute a Parent Process; and associating Parent processes and subsidiary Processes hierarchically.

4. The method of claim 3 comprising the further step of:

exporting Entities, Attributes, assignments therebetween, token identifiers therefor, and associated Parent Processes and subsidiary Processes data to a computer-based information engineering tool.

5. The method of claim 4 wherein the exporting step includes the step of communicating, under computer control, the assigned type codes.

6. The method of claim 1 comprising the further step of:

storing entered Component inputs in a database associated with a project.

7. Apparatus for gathering Information for modelling a preselected Process or a dataflow, said apparatus comprising:

a local area network having a plurality of user terminals and an analyst terminal on the network, each terminal having a respective display and means for entering data;

computer server means, connected to the network and having a centralized database, for receiving from the terminals and storing in the database Information related to the preselected Process or dataflow;

means for displaying at least one data item on each user display to prompt each user to selectively respond with input;

means for providing the same data items to each user display for display at the same time;

means for enabling the user at each user terminal to enter natural language Information for the preselected Process or dataflow into the centralized database;

means for storing data received from the plurality of user terminals in common tables in the centralized database;

information engineering tool means for constructing decomposition models or dataflow models or Entity relationship diagrams or a combination thereof based on data files having a prescribed format;

bridge means for converting the stored data in the database into data files in the prescribed format; and means for connecting the bridge means and information engineering tool means and for exporting the data files converted by the bridge means to the information engineering tool means;

wherein the bridge means includes:

token identifier means for assigning and storing, in files corresponding to the files recognized by the information engineering tool means, token identifiers for (i) Parent Processes and subsidiary Processes that compose each Parent Process, (ii) Data Flows, (iii) External Agents, (iv) Associations, (v) Entities associated with Data Flows, and (vi) Attributes associated with Entities;

means for selecting and associating all offspring Processes which compose a Parent Process and storing an association therebetween; and means for assigning, to Information assigned a token by the token identifier means, type codes that are prescribed by the information engineering tool means.

8. The apparatus of claim 7 wherein the data files include:

an Object file, an Association file, a Property file, and a text file, each file including records of data.

9. The apparatus of claim 7 wherein the screen displaying and prompting means includes:

means for ascribing a functional hierarchy to Processes to indicate which subsidiary Processes constitute a Parent Process; and wherein the bridge means includes means for associating Parent processes and subsidiary Processes hierarchically.

10. The apparatus of claim 7 further comprising:

means for displaying to users of the terminals a representation of the stored data collected from the plurality of terminals;

wherein only the analyst terminal includes means for editing the stored data as the analyst or users propose.

* * * * *